Figure 1:
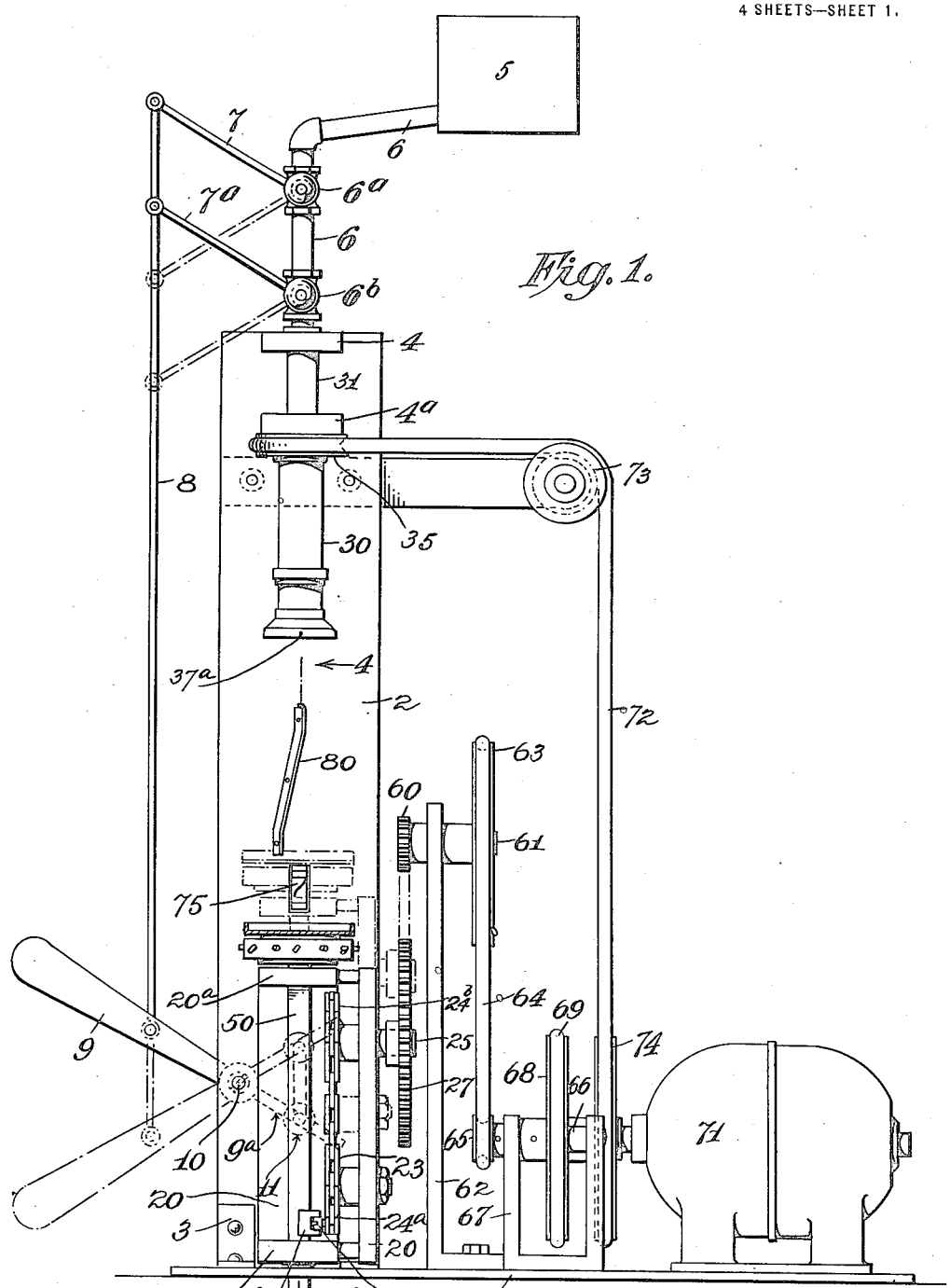

J. N. WHITEHOUSE.
MACHINE FOR MAKING SEAMLESS CELLULOID ARTICLES.
APPLICATION FILED APR. 25, 1912.

1,203,947.

Patented Nov. 7, 1916.

Attest:
W. McGinn
A.C. McDonnell

Inventor:
by John N. Whitehouse
G.W. Scherz Jr. Atty

J. N. WHITEHOUSE.
MACHINE FOR MAKING SEAMLESS CELLULOID ARTICLES.
APPLICATION FILED APR. 25, 1912.
1,203,947.
Patented Nov. 7, 1916.
4 SHEETS—SHEET 2.
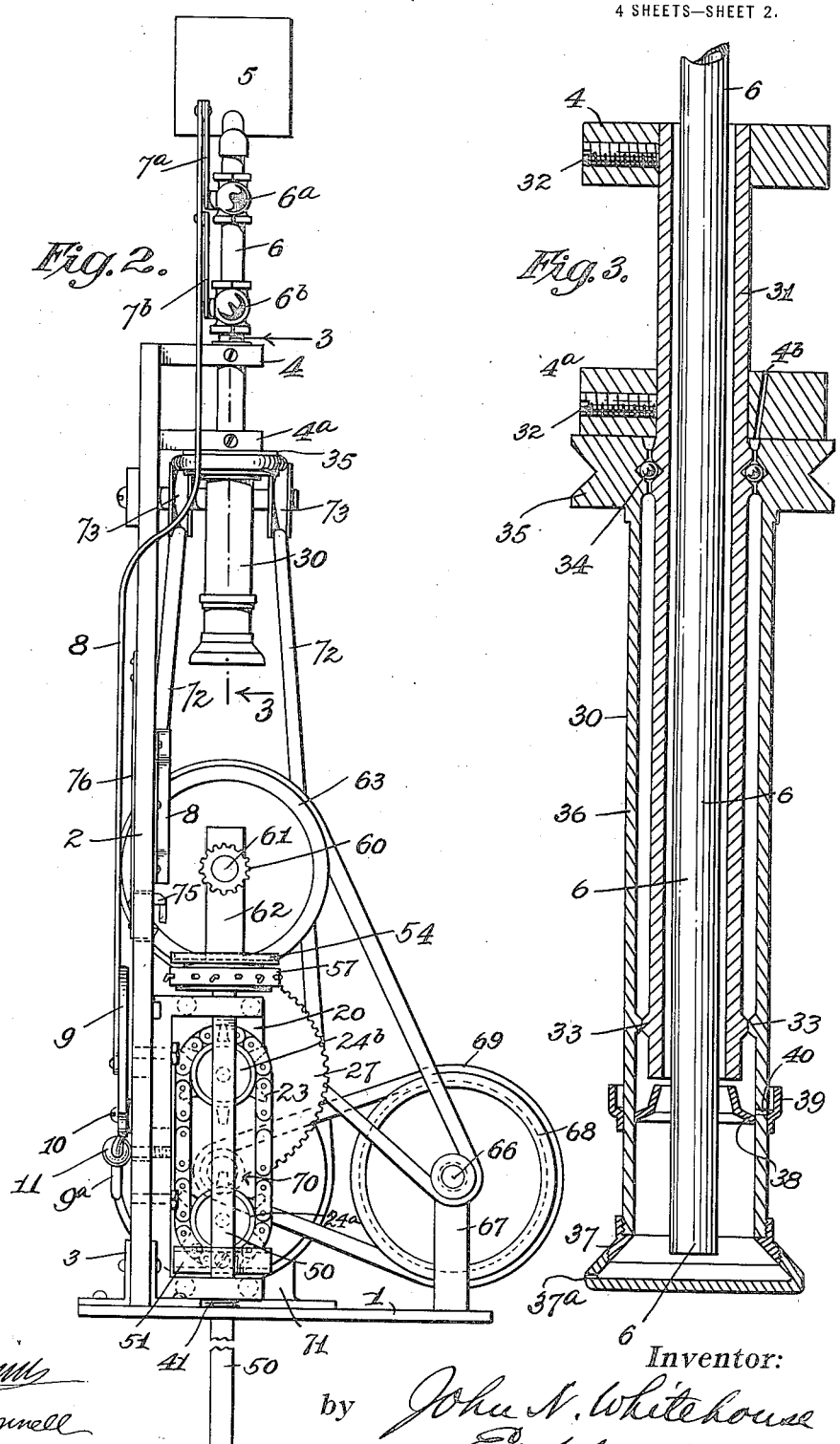
Inventor:
by John N. Whitehouse
Ed. Scherr Jr. Atty

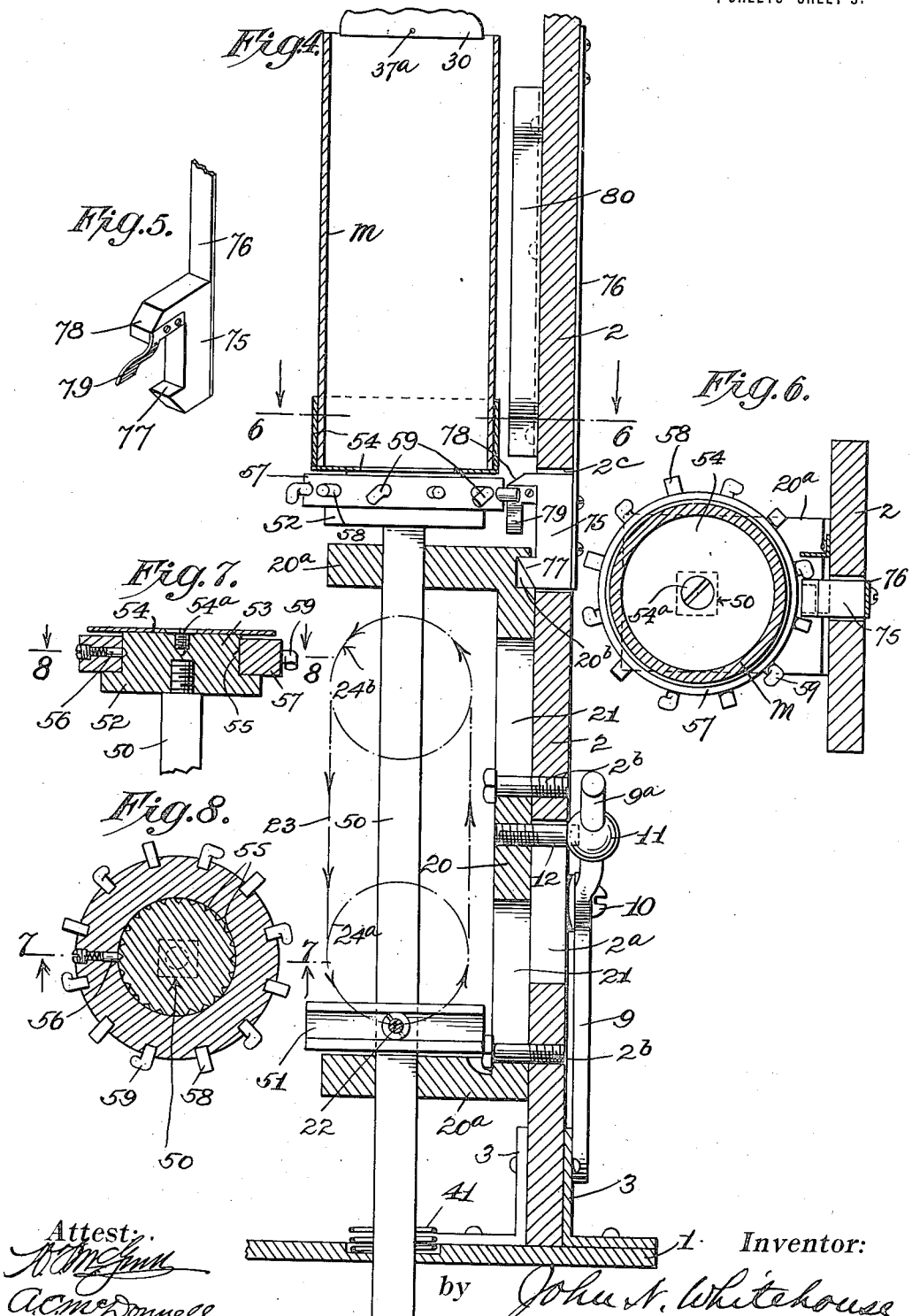

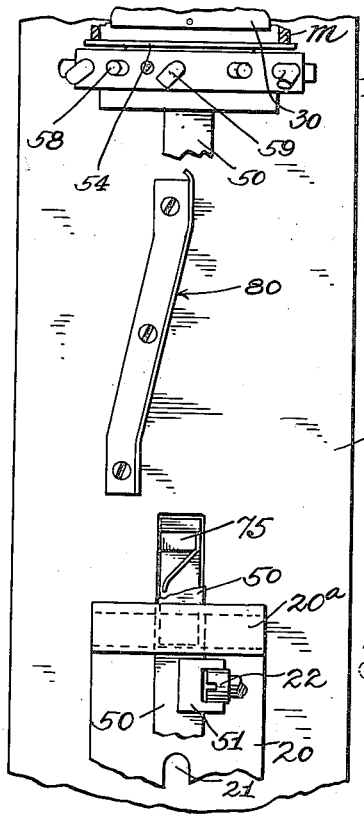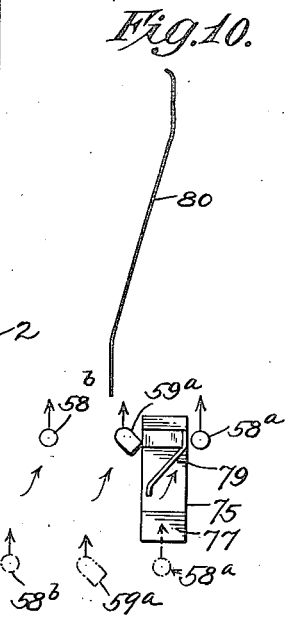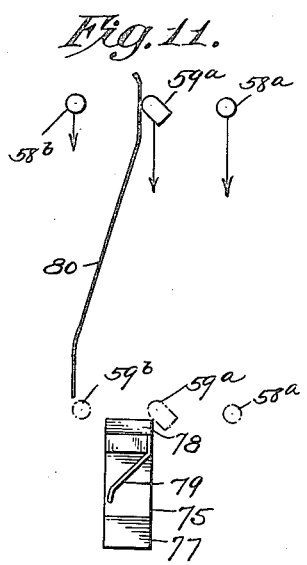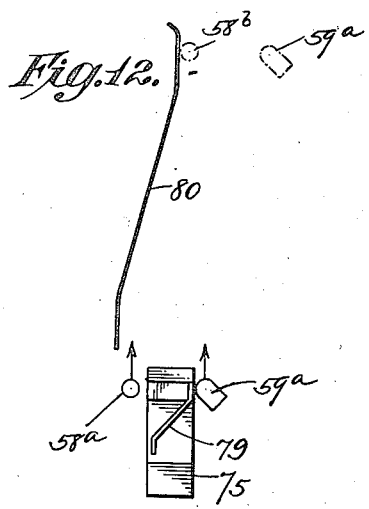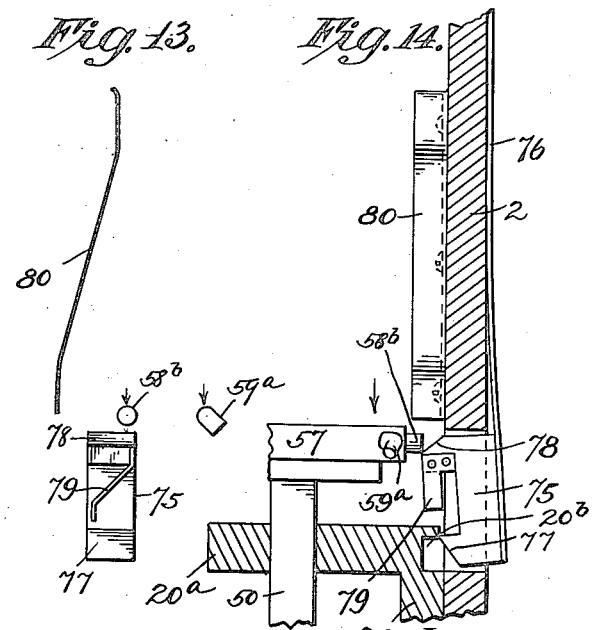

UNITED STATES PATENT OFFICE.

JOHN N. WHITEHOUSE, OF NEWARK, NEW JERSEY.

MACHINE FOR MAKING SEAMLESS CELLULOID ARTICLES.

1,203,947. Specification of Letters Patent. Patented Nov. 7, 1916.

Application filed April 25, 1912. Serial No. 693,267.

*To all whom it may concern:*

Be it known that I, JOHN N. WHITEHOUSE, a citizen of the United States, residing at Newark, in the county of Essex and State of New Jersey, have invented certain new and useful Improvements in Machines for Making Seamless Celluloid Articles, of which the following is a specification.

The object of my invention is to provide a machine for making seamless celluloid tubes and other articles; and further relates to a new product. The illustrated machine delivers a determined quantity of a quickly drying celluloid solution from a rotating jet or nozzle against the surface of a mold of the article to be formed, and said machine simultaneously reciprocates said mold to present its surface a determinable number of times for coating with the celluloid solution delivered from said nozzle, whereupon the machine automatically stops said reciprocations of the mold and simultaneously operates valve-means connected with the supply of the celluloid solution which measures off the right quantity of solution for use in the next operation of the machine.

The drawings illustrate only one of the particular embodiments which my invention is adapted to take.

In them, Figure 1 is a front elevation of a machine within my invention; Fig. 2 is a side elevation looking from the left of Fig. 1; Fig. 3 is a vertical section on an enlarged scale of the centrifugal distributing device taken on the line 3—3 of Fig. 2; Fig. 4 is an enlarged section taken on the line 4—4 of Fig. 1 but showing the carriage in its up or operating position; Fig. 5 is a detail perspective of the spring latch; Fig. 6 is a horizontal section on the line 6—6 of Fig. 4; Fig. 7 is a vertical section of the rotatable sleeve on the line 7—7 in Fig. 8; Fig. 8 is a horizontal section on the line 8—8 of Fig. 7; Fig. 9 is a detail front elevation of a portion of the machine showing the carriage and rotatable sleeve in their upper or operating position; Figs. 10 to 14 are diagrams illustrating the operation of the means for effecting two complete reciprocations of the mold and then unlocking the carriage and stopping further reciprocation of the mold.

I will now describe the specific devices shown in the drawings.

1 is a bed plate on which is mounted an upright plate 2 secured thereto by angle irons 3. At the top of the plate 2 are secured two horizontal lugs 4 and $4^a$ which support a centrifugal distributing device 30 (Figs. 1 and 2, and compare Fig. 3).

Located above the machine is a tank 5 to hold the supply of celluloid solution. From the tank 5 extends a pipe 6 having two valves $6^a$ and $6^b$ whose ports are so arranged that when one valve is open the other is closed. The supply pipe 6 extends down into the bottom of the cylindrical casing or distributer 30 (Fig. 3). Levers 7 and $7^a$ connect the valves $6^a$ and $6^b$ to an upright connecting rod 8 which is attached to an operating handle 9 pivoted at 10 to the vertical plate 2. When the lever 9 is depressed by the operator to operate the machine, the upper valve $6^a$ is closed and the lower valve $6^b$ is opened to allow the quantity of the celluloid solution that was in the pipe 6 between the valves to flow down into the distributer 30. Vice versa, when the handle 9 is raised (which as will later appear occurs automatically in the operation of the machine), the lower valve $6^b$ is closed and the upper valve $6^a$ is opened, thereby permitting a fresh supply of solution to fill the pipe between the valves ready for delivery as aforesaid when the operator again depresses the handle 9.

The handle 9 has an extension $9^a$ which is slidably connected to a swivel knob 11 (compare Figs. 1 and 4) on the end of a pin 12 which projects through a vertical slot $2^a$ in the plate 2 from a vertically movable carriage 20. This carriage 20 (Fig. 4) is supported to permit its vertical adjustment on the plate 2 by means of stationary bolts $2^b$ screwed into said plate and projecting freely through vertical guide slots 21 in the carriage (compare Figs. 2 and 4).

The carriage 20 has two horizontal lugs $20^a$ perforated by square holes through which reciprocatingly passes a square sectioned rod 50 on which is mounted a horizontally grooved block 51 (Figs. 1 and 4) whose groove receives slidably into it the cylindrical head of a screw 22 on the face of a sprocket wheel $24^a$ rotatably mounted on the vertical side of the carriage 20 and connected by a sprocket chain 23 with a similarly mounted upper sprocket wheel $24^b$. The shaft 25 of this upper sprocket wheel has a gear 27 (Fig. 1) on its other end beyond the vertical side of the carriage 20 adapted to engage a pinion 60 on a shaft 61 which is journaled in a stationary frame 62 secured to the bed plate 1 of the machine. At the other end of the shaft 61 is secured a pulley 63 connected by a belt 64 to a pulley 65 on a shaft 66 mounted in a frame 67 secured to the bed plate 1. On the shaft 66 is further secured a pulley 68 connected by a belt 69 to a pulley 70 (Fig. 2) on the drive shaft of a motor 71 (Fig. 1). It is apparent from this arrangement that when the lever 9 is depressed the carriage 20 will be raised to carry its gear 27 into engagement with the constantly rotating pinion 60, whereupon the sprocket wheel 24ᵃ will be driven and its crank pin 22 will reciprocate the square sectioned rod 50 up and down through the horizontal lugs 20ᵃ of the carriage 20. A latch 77 supports the carriage 20 in its described elevated and operating position, best shown in Fig. 4, until said latch is automatically released to permit the carriage to drop as explained later.

52 is a disk which screws on the threaded upper end of the rod 50 (Fig. 7). This disk has a reduced portion 53, to the top of which is secured a cup-like platform 54 by a screw 54ᵃ.

57 is a sleeve which rotatably surrounds said reduced portion 53. It has an inwardly directed spring-pressed, blunt-pointed pin 56 to coöperate with corresponding recesses 55 (Figs. 7 and 8) (twenty-four in number) around the periphery of the reduced portion 53. The outer periphery of the sleeve 57 carries six equally spaced apart straight pins 58 alternating with six bent or cam-headed pins 59.

M is a mold, in this case a hollow cylindrical metal tube which fits into the cup-like platform 54 so as to partake of the reciprocation of the rod 50. The upper end of the mold is open so as to receive into it the liquid celluloid-distributing device 30 when said mold reciprocates relative to said distributing device.

The purpose of the described rotatable sleeve 52 and its pins 58 and 59 is for the latter to coöperate with means now to be described for automatically stopping the reciprocation of the rod 50 and the supported mold M after a determined number of said reciprocations. Thus, 75 (compare Figs. 5, 4, etc.) is a latch on the end of a leaf spring 76 secured to the back of the vertical plate 2, said latch projecting through an opening 2ᵃ in said plate. This member 75 has a beveled projection 77 for entering a recess 20ᵇ in the upper part of the carriage 20 when the latter is lifted into its up position. The following features of the latch member 75 are part of the means for releasing said projection 77 from locking engagement to permit the carriage to drop and thereby carry its gear 27 out of mesh with the constantly rotating pinion 60, and so stop further reciprocation of the rod 50 and of the supported mold. These features of said member 75 comprise the downwardly beveled upper projection 78 thereof and the inclined cam-strip 79 supported therefrom (compare Fig. 5). A further member taking part in this automatic release of the carriage 20 after the determined number of reciprocations of the mold is the cam-strip 80 (compare Figs. 1 and 2) mounted on the front face of the vertical plate 2 over the latch member 75.

Figs. 10 to 14 show diagrammatically the operation of this reciprocation-determining and carriage-releasing means. Figs. 10 to 13 inclusive are face views of the parts showing, however, only three of the pins in the different positions of vertical elevation into which they are carried by the reciprocation of the rod 50. Before lifting the carriage 20 into its elevated position, the sleeve 57 is rotated by hand so that one of its straight pins 58 is located under the cam-strip 79 of the latch member, as shown by the dotted lines 58ᵃ representing said pin in Fig. 10. The carriage having been lifted, the rod 50 and therefore the mold immediately begins its first up stroke and said pin 58ᵃ rides under and is cammed to the right by the strip 79 into the position shown by the full lines 58ᵃ with corresponding rotation of the sleeve 57. Next, the bent pin 59ᵃ engages the strip 80 and is cammed still further to the right into the position shown by the full lines 59ᵃ in Fig. 11 at the top of the first up stroke of the mold.

It will be noted that this position is vertically over the right hand corner of the beveled projection 78 of the latch member 75 with the result that as the mold nears the completion of said downward reciprocation, said pin 59 strikes said corner of the latch member. However, its inclined head glances off said corner without pushing back and releasing the latch 75. This down stroke is then followed by another up stroke which, as indicated in Fig. 12, results in the next adjacent straight pin 58ᵇ being cammed by the strip 80 into the same aforesaid vertical position over the corner of the latch 75. Finally, the fourth stroke occurs downwardly and this pin 58ᵇ (because it has no inclined head) strikes down squarely on top of the beveled projection 78 of the latch 75, (see the side view of Fig. 14) and pushes it back to unlock the projection 77 from the carriage 20, whereupon the latter drops by its own weight (being cushioned by the spiral spring 41 in Fig. 4) and stops further reciprocation of the mold by disengaging the gear 27 from the pinion 60. At the same time, this drop of the carriage operates the valves as previously described to close the bottom valve 6$^b$ and open the upper valve 6$^a$ to measure off a proper quantity of celluloid solution for use on the next operation of the machine by depressing the handle 9 to make another article.

It remains now to describe the distributing devices for delivering the liquid celluloid against the inside of the mold M.

31 (compare Fig. 3) is an inner tube secured in openings in the lugs 4 and 4$^a$ by set screws 32. This tube is provided with an annular bearing ridge 33 and ball bearings 34 on which rotates an outer tube 36 having a pulley 35 at its upper end. This tube 36 has a bottom 37 in the form of a receptacle which screw-connects therewith. This bottom 37 is itself made up of two parts screwed together and has a small hole 37$^a$ from which the celluloid solution is delivered centrifugally in a fine stream or jet when the tube 30 is rotated at high speed as hereinafter described.

Lubrication is provided for the described bearings by an oil hole 4$^b$ (Fig. 3) which leads to the ball bearings 34, whence the oil can deliver to the bearing ridges 33 and from them into the annular tray 38 secured on the inside of the tube 36, whence it is carried through a hole 40 to an outer tray 39.

The celluloid solution supply-pipe 6 extends down into the bottom 37 of the rotating tube 30. This tube 30 is rotated at high speed by means of a belt 32 which encircles the pulley 35, thence to guide pulley 73 and then over a larger pulley 74 on the motor 71.

The operation of the machine will be apparent from the foregoing description. A mold M is mounted upon the platform 54 and the carriage 20 is raised and latched in its up position by depressing the operating handle 9. This acts upon the valve means 6$^a$ and 6$^b$ to measure off and deliver a quantity of celluloid solution down the pipe 6 into the bottom 37 of the rotating tube 30. At the same time it also brings the gear 27 into mesh with the rotating pinion 60 and starts the rod 50 and the supported mold to reciprocate. The length of the reciprocating stroke is such that the jet of liquid celluloid thrown from the opening 37$^a$ is caused to cover the inside of the mold. The pins 58 and 59 acting in conjunction with the related means cause the particular machine shown to make four complete strokes or reciprocations with the result that four successive layers of celluloid solution are applied to the inside of the mold, whereupon it is arranged that the celluloid solution in the bottom of the tube 30 shall have been used up and the reciprocations are automatically stopped concurrent with the automatic release or unlatching of the carriage 20 which, in dropping, elevates the handle 9 and again operates the valve means 6$^a$ and 6$^b$ preparatory to measuring off a fresh quantity of celluloid solution for use in making the next article.

The successive layers of celluloid solution applied as above to the surface of the mold quickly set and give as a result a seamless article, in this case a cylindrical tube. If greater thickness is desired for the article than four layers, then the above operation can be repeated to deposit four more layers, etc. If desired, the mold may be reversed end for end in the supporting cup 54 between each operation of the machine. When all the layers desired have been deposited, the celluloid tube by its own shrinkage separates itself from the mold and can be withdrawn. An important use of these seamless celluloid tubes is to support them on a suitable cylindrical core and use them for phonograph records. For this purpose the wall of the celluloid tube may be about ten-thousandths of an inch thick. The sound record may be impressed thereon before the tube is put upon said cylindrical core. Another way is to form the inside of the mold M with the reverse of the sound waves of the finished record, and then to jet or impact the celluloid solution against this surface. When the resulting tube separates from this mold or matrix, it leaves a very perfect representation of the sound waves thereon.

The aforesaid straight and bent pins may be interchanged to vary the number of strokes of the mold. Thus, four strokes are obtained when the straight and bent pins merely alternate as in the machine illustrated. However, if two bent pins intervene between the two straight ones, then the machine will make six strokes. If still another intervene, then the machine will make two additional strokes, and so on.

I get good results by operating the distributer 30, or rather its outer tube 36, at about five thousand revolutions per minute. This throws the celluloid solution centrifugally with considerable force against the inside of the mold and follows this by impacting the layers hard on top of one another. The result is to give a celluloid which is denser than if it had been merely flowed on without impact or pressure; and said resulting celluloid has other desirable qualities that make it a superior material for sound records.

The fact that the celluloid solution is forced violently from the orifice 37$^a$ by pressure behind it permits said orifice to be much smaller than if the solution merely flowed by gravity from an orifice upon the surface of the mold. This means that the respective layers applied by the jet are thinner than those which could be flowed on. This in turn means that the thin layers remain to a maximum extent uniformly distributed at an even depth all over the mold, whereas the thicker flowed-on layers do not, but continue to flow and produce unevenness and inequalities in the layer when dry.

The celluloid solution which I use is relatively thin and I filter it so as to eliminate particles which would interfere with the needle in sound reproduction. The tube being dense, homogeneous and entirely seamless, is an excellent material to record and reproduce sound waves.

The described process and machine may possibly be practised and used to produce other than celluloid materials. For example, a solution of wax or other suitable material might be substituted for the celluloid solution; and the claims for said process and machine are to be read accordingly as extending to such equivalent uses of the foregoing inventive ideas.

What I claim is:

1. A machine for making seamless celluloid articles which comprises in combination a mold, a jet which delivers celluloid solution against said mold, means for relatively rotating the mold and the jet and means for automatically reciprocating said mold and jet relatively to each other a number of times to cause the jet to cover the surface of the mold.

2. A machine for making seamless celluloid articles comprising in combination a hollow mold, a jet receivable into said mold for delivering celluloid solution against its interior, said jet and mold being relatively rotatable, and means for automatically reciprocating said mold and jet relatively to each other a number of times to cause the jet to cover the surface of the mold.

3. A machine for making seamless celluloid articles which comprises in combination a mold, a rotating jet which delivers celluloid solution against said mold, and means for reciprocating said mold and jet relatively to each other to cause the jet to cover the surface of the mold, and means which automatically stops said reciprocations after a determined number thereof has occurred.

4. A machine for making seamless celluloid articles comprising in combination a hollow mold, a rotating jet receivable into said mold for delivering celluloid solution against its interior, means for reciprocating said mold and jet relatively to each other to cause the jet to cover the surface of the mold, and means which automatically stops said reciprocations after a determined number thereof has occurred.

5. A machine for making seamless celluloid articles which comprises in combination a mold, a rotating jet which delivers celluloid solution against said mold, means for reciprocating said mold and jet relatively to each other to cause the jet to cover the surface of the mold, and means for automatically dividing off the supply of celluloid solution so that the jet delivers a quantity thereof proportionate to each article.

6. A machine for making seamless celluloid articles comprising in combination a hollow mold, a rotating jet receivable into said mold for delivering celluloid solution against its interior, means for reciprocating said mold and jet relatively to each other to cause the jet to cover the surface of the mold, and means for automatically dividing off the supply of celluloid solution so that the jet delivers a quantity thereof proportionate to each article.

7. The combination with an elongated mold having an open end, of a jet receivable into the mold through said open end, said mold and jet being relatively movable longitudinally of the mold, means for automatically effecting a relative rotation between the jet and mold, and means for effecting a number of relative longitudinal movements between the mold and jet.

8. In a machine of the character set forth, the combination with a mold, of a jet receivable thereinto, said mold and jet being relatively reciprocable and said jet having a discharge orifice extending solely in a direction transverse to the direction of relative reciprocation of the mold and jet, and means for effecting a plurality of such relative reciprocations and means for effecting a relative rotation of the mold and jet.

In testimony whereof I affix my signature in presence of two witnesses.

JOHN N. WHITEHOUSE.

Witnesses:
  E. W. Scherr, Jr.,
  A. C. McDonnell.